United States Patent Office 3,304,278
Patented Feb. 14, 1967

3,304,278
FLUORINATED UNSATURATED ORGANIC COMPOUNDS AND POLYMERS THEREOF
Murray Hauptschein, Glenside, and Sameeh S. Toukan, Phoenixville, Pa., assignors to Pennsalt Chemicals Corporation, Philadelphia, Pa., a corporation of Pennsylvania
No Drawing. Filed Feb. 25, 1966, Ser. No. 529,937
9 Claims. (Cl. 260—29.6)

This invention relates to certain polymerizable acrylates containing perfluoroalkyl tails and homopolymers and copolymers prepared therefrom.

This application is a continuation-in-part of application Serial No. 276,160, filed April 29, 1963, for "Fluorinated Amido Carboxylic Acids and Salts Thereof," by Murray Hauptschein and Sameeh Toukan, now U.S. Patent 3,238,235.

It is known that polymerizable acrylates containing relatively long-chain perfluoroalkyl end groups or "tails" in the molecule provide polymers that have exceptional resistance to wetting by both aqueous and oleaginous systems. They are both hydrophobic and oleophobic due to the extremely low surface tension imparted by the perfluoroalkyl portion of the molecule. Polymers of such acrylates are useful particularly in the form of latices for the surface treatment of textiles, paper and other fibrous substrates to impart water and oil repellency, making these materials resistant to staining by both aqueous and oily soils.

Because of the high cost of these perfluorinated materials, it is essential that they be effective in minimum amounts and much research has been undertaken directed to the tailoring of the monomer molecule to enhance the water and oil repellency properties of the polymers and copolymers that may be prepared therefrom. It has been observed that not only does the perfluorinated portion of the molecule (especially its chain length) have an important influence on these properties, but that the hydrocarbon portion of the monomer molecule also may influence these same properties to a significant degree. Just how the configuration of the hydrocarbon part of the monomer molecule influences the overall oil and water repellency characteristics of the polymer is not understood. It is possible that the arrangement of the hydrocarbon portion can effect the orientation of the perfluoroalkyl tails on the surface of the polymer and, in this manner, may modify the surface characteristics even where the fluorocarbon portion is constant in size and configuration. Whatever the explanation, it has been found impossible to predict in advance the effect of modifications in the hydrocarbon portion of the monomer.

In accordance with the present invention, it has been found that certain novel amidoalkyl acrylates [1] of perfluorinated carboxylic acids in which the amido nitrogen carries a tertiary butyl group or similar bulky alkyl group, provide polymers displaying markedly superior surface properties as compared to similar amidoalkyl acrylates where the amido nitrogen carries a hydrogen or lower alkyl group such as methyl in the place of the tertiary butyl group. Both the oil and water repellency characteristics of the polyacrylates prepared from such monomers are surprisingly superior. These monomeric acrylates of the invention may be represented by the general formula:

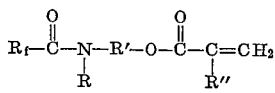

[1] "Acrylates" includes methacrylates except where the context otherwise indicates.

where $R_f$ is a perfluorinated alkyl radical which may have a straight or branched chain, having from four to eighteen carbon atoms, where R is a bulky alkyl radical, having from four to ten carbon atoms and having at least one tertiary carbon atom; where R' is an alkylene radical having from two to six carbon atoms, and where R" is hydrogen or methyl. Preferably, $R_f$ is a perfluoroalkyl group having from six to fifteen carbon atoms. R is preferably tertiary butyl. R' is preferably an alkylene radical having from two to four carbon atoms and R" is preferably methyl. A particularly preferred group of compounds are those of the formula:

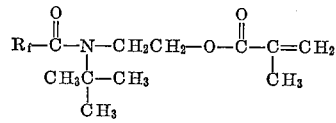

where $R_f$ is as defined above.

Polymers, including homopolymers, and copolymers with other ethylenically unsaturated compounds, may be prepared from the above acrylates by the various techniques well known in themselves, for the polymerization of acrylates such as emulsion or solution polymerization, to produce novel polymers containing repeating units of the following structure:

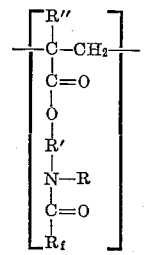

The preferred polymerization technique is emulsion polymerization in an aqueous medium to produce an aqueous latex suitable for application before or after compounding with other materials, to textiles, paper and other fibrous substrates.

PREPARATION OF THE ACRYLATE MONOMER

The novel aminodialkyl acrylates of the invention are preferably prepared by the reaction of a perfluoroalkyl acyl halide, and preferably a perfluoroalkyl acyl fluoride, with an aminoalkyl acrylate as illustrated, for example, by the following:

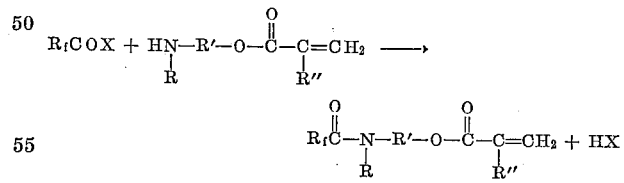

where X is halogen, preferably chlorine or fluorine, and where $R_f$, R, R' and R" are as defined above.

The above reaction is preferably carried out by dissolving or suspending the perfluoroalkyl acyl halide in an inert solvent, such as, for example, diethyl ether, petroleum ether, hexane, or a chlorofluorinated hydrocarbon such as $CF_2ClCFCl_2$. This mixture is heated to reflux, preferably under nitrogen or other inert atmosphere, and the aminoalkyl acrylate is added slowly to this refluxing mixture while stirring. After the addition is complete, the mixture is refluxed for an additional time, such as from two to five hours. Reaction temperatures from 0° C. to 150° C. and more usually from 20° C. to 100° C. will be used. The aminoalkyl acrylate is preferably used in stoichiometric excess to insure high conversion of the perfluoroalkyl acyl halide. Molar ratios of the amine to the acyl halide preferably range from 1.4:1 to 3:1 and more usually from 1.5:1 to 2:1. The reaction is generally carried out most conveniently at atmospheric pressure with reaction times of from about 10 minutes to 10 hours and more usually from 1 to 4 hours. When the reaction is complete, the reaction mixture is filtered to remove insoluble material which generally includes excess amine, mostly in the form of its hydrogen halide salt. The amidoalkyl acrylate product may be recovered from the filtrate by evaporation of the solvent. In some cases, washing of the filtrate with water and dilute acid to remove excess amine may be desirable. If desired, the product may be recrystallized and/or distilled to increase the degree of purity.

A second, less preferred procedure for preparing the amidoalkyl acrylates of the invention involves the reaction of a perfluoroalkyl acyl halide with an alkanol amine followed by the esterification of the resulting amido alkanol. Standard procedures may be used including, e.g., trans-esterification such as with alkyl acrylates or methacrylates, or direct esterification with the proper acid such as acrylic acid or methacrylic acid or with an acrylyl or methacrylyl halide.

A third less preferred alternative procedure for the preparation of the amidoalkyl acrylates of the invention involves the reaction of a perfluoroalkyl acyl halide with the hydrochloride or hydrobromide salt of an aminoalkyl acrylate in a neutral solvent such as benzene. The mixture is refluxed for several hours and the product recovered as described above. A slight molar excess of the perfluoroalkyl acyl halide is usually preferred in this procedure.

The above procedures may be employed to prepare individual amidoalkyl acrylates or, if desired, mixtures of amidoalkyl acrylates may be prepared wherein the perfluoroalkyl group $R_f$ is of varying chain length. This is of practical importance where the perfluoroalkyl acyl halides are obtained by procedures involving telomerization reactions providing perfluoroalkyl acyl halides of varying chain length. For example, the perfluoroalkyl acyl halide, $R_fCOX$, may be available as a mixture in which the chain length of the perfluoroalkyl group $R_f$ varies from six to twelve carbon atoms. By reacting such a mixture with the proper aminoalkyl acrylate, a suitable mixture of amidoalkyl acrylates may be prepared.

The following are typical specific examples of the amidoalkyl acrylate monomers of the invention:

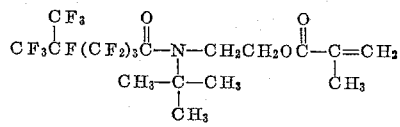

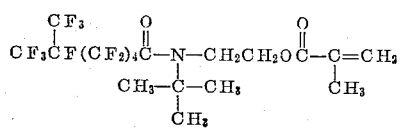

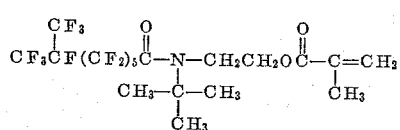

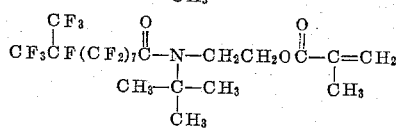

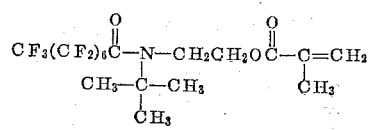

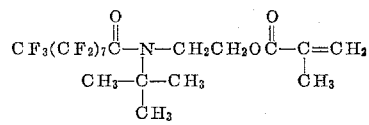

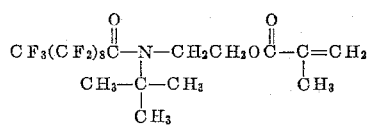

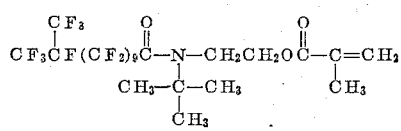

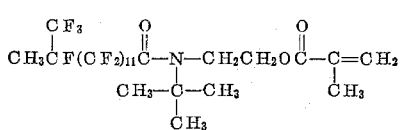

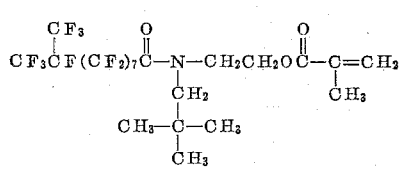

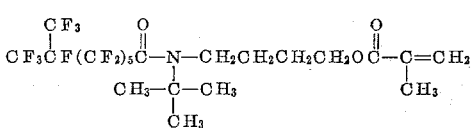

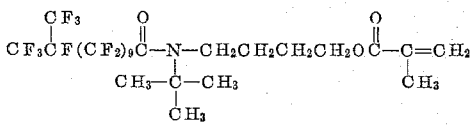

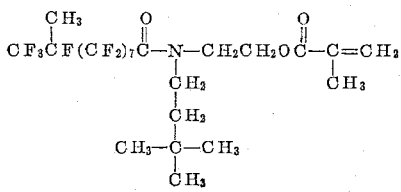

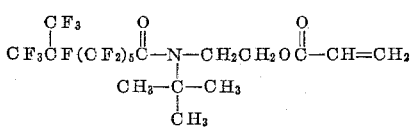

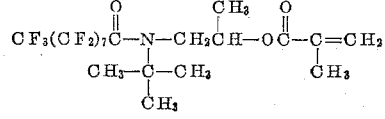

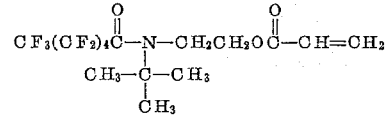

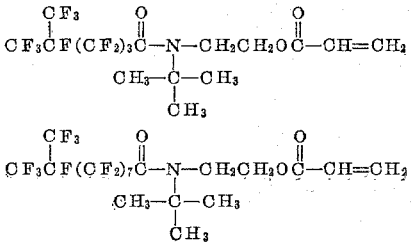

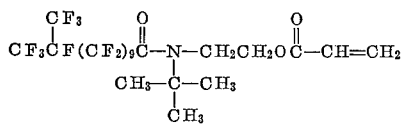

The following examples illustrate the preparation of the amidoalkyl acrylate monomers of the invention:

*Example 1.—Preparation of N-tertiary-butyl-N-(perfluoro-9-methyldecanoyl) aminoethyl methacrylate*

A solution of 56.6 grams (0.1 mole) of

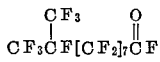

in 50 milliliters of anhydrous diethyl ether is added slowly to a stirred solution of 46.3 grams (0.25 mole) of tertiary-butylaminoethyl methacrylate,

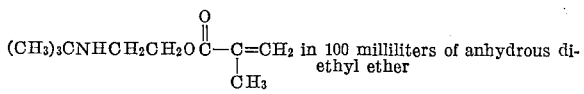

under dry nitrogen. During the addition, a small amount (0.5 gram) of a very fine white precipitate is formed which is filtered off after refluxing the reaction mixture for 4.5 hours. The filtrate is washed with 200 milliliters of water followed by four 100 milliliter portions of 1 N HCl, then with four 100 milliliter portions of 5% sodium bicarbonate solution and finally dried with anhydrous magnesium sulfate, and evaporated on a steam bath to yield 60.0 grams (82% yield) of a liquid residue which solidifies slowly on standing at room temperature. This product, having a melting point of 42.5–43.5° C., has the structure

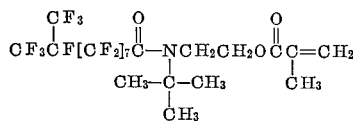

The infrared spectrum of this compound shows an ester band at 5.76μ, an amide band at 5.9μ, and a 6.1μ peak characteristic of a double bond.

*Analysis.*—Calculated for $C_{21}H_{18}F_{21}NO_3$: C, 34.6; H, 2.48; N, 1.92. Found: C, 34.5; H, 2.61; N, 1.72.

*Example 2.—Preparation of N-tertiary-butyl-N-(perfluoro-7-methyloctanoyl) aminoethyl methacrylate*

Following the procedures of Example 1, the acid fluoride

is reacted with tertiary-butylaminoethyl methacrylate to provide a white crystalline product in 87% yield having a melting point of 41.5–42° C. and having the same structure as in Example 1. The infrared spectrum of this compound shows characteristic bands at 5.79μ, 5.9μ and 6.1μ.

*Analysis.*—Calculated for $C_{19}H_{18}F_{17}NO_3$: C, 36.1; H, 2.87; N, 2.22. Found: C, 36.2; H, 3.10; N, 2.37.

*Example 3.—Preparation of N-tertiary-butyl-N-(perfluoro-11-methyldodecanoyl) aminoethyl methacrylate*

Following the procedure of Example 1, the acid fluoride

is reacted with tertiary-butylaminoethyl methacrylate and there is obtained a white crystalline solid having the structure

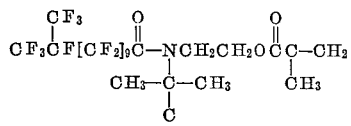

*Example 4.—Preparation of N-tertiary-butyl-N-(perfluoro-9-methyldecanoyl) aminoethyl methacrylate*

To a stirred solution of 1686.8 g. (2.98 moles) of

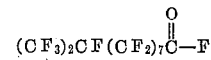

in 5.5 liters of petroleum ether, heated under reflux, there is slowly added 828.0 g. (4.46 moles) of tertiary-butylaminoethyl methacrylate,

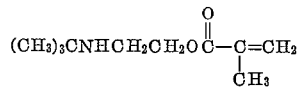

in 0.5 liter of petroleum ether. The addition is carried out under a nitrogen atmosphere. The mixture is then refluxed for 2 hours, cooled to 15–20° C., and the white precipitate is filtered off. The filtrate is heated on a steam bath to remove the solvent and the liquid residue which solidifies slowly on standing at room temperature weighs 2028.5 g. (94% yield) after drying in vacuo and melts at 42–43.5° C. The infrared spectrum of this product having the structure

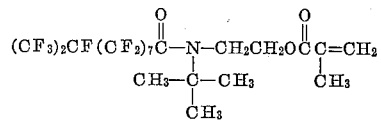

shows an ester band at 5.76μ, an amide band at 5.9μ, and a 6.1μ peak, characteristic of a double bond.

*Example 5.—Preparation of N-tertiary-butyl-N-(perfluoro-11-methyldodecanoyl) aminoethyl methacrylate*

Tertiary-butylaminoethyl methacrylate (55.5 g.; 0.3 mole) is added slowly into an ice-cooled well-stirred solution of 135.0 g. (0.203 mole) of

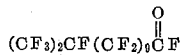

in 200 ml. of $CF_2ClCFCl_2$. After addition is complete, the cold bath is removed and the mixture is stirred for about 30 minutes to warm up to room temperature. It is then refluxed for 2 hours under a nitrogen atmosphere. The reaction mixture, after separation from a small immiscible oily layer, is washed once with a 200 ml. portion of water, twice with a 100 ml. portion of 1 N HCl, twice with 100 ml. portion of 5% $NaHCO_3$ and finally with one 150 ml. portion of water, dried with anhydrous magnesium sulfate and heated on a steam bath to remove solvent. The resulting liquid residue solidifies on standing at room temperature to yield after drying in vacuo a total of 159.0 g. (95%) of white crystalline solid. The melting point of this product having the structure

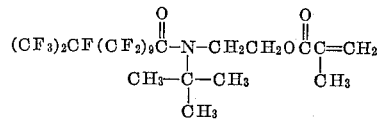

is 67–68° C. and the infrared spectrum shows an ester band at 5.8μ, an amido band at 5.9μ, and a 6.1μ peak, characteristic of a double bond.

*Analysis.*—Calculated for $C_{23}H_{18}F_{25}NO_3$: C, 33.2; H, 2.18; N, 1.68. Found: C, 33.2; H, 2.16; N, 1.60.

*Example 6.—Preparation of N-tertiary-butyl-N-(perfluoro-5-methylhexanoyl) aminoethyl methacrylate*

To a stirred, ice-cold solution of 73.7 g. (0.2 mole) of $(CF_3)_2CF(CF_2)_3COF$ in 200 ml. of $CFCl_2CFCl_2$, there is added slowly 74.0 g. (0.4 mole) of tertiary-butylaminoethyl methacrylate. After the addition is complete, the mixture is stirred at room temperature and then refluxed for 2.5 hours. The reaction mixture is then filtered, removing a white crystalline solid, and the filtrate is then washed with water, then with dilute HCl, and then with aqueous sodium carbonate, and finally washed with an aqueous solution containing 1% NaOH and 25% sodium carbonate. The filtrate is then dried with anhydrous magnesium sulfate and evaporated on a steam bath, producing 96.7 g. of a liquid product (90% yield) having a boiling point of 102°–103° C. at 0.1 mm. Hg having the structure

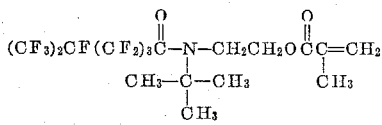

*Analysis.*—Calculated for $C_{17}H_{18}F_{13}NO_3$: C, 38.4; H, 3.4; N, 2.60. Found: C, 38.7; H, 3.8; N, 2.53.

*Example 7.—Preparation of*

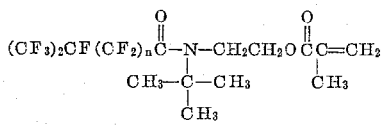

where $n$ varies from 3 to 9

A mixture of acid fluorides of the formula

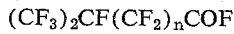

is employed, containing 25% by weight each of such compounds where the value of $n$ is respectively 3, 5, 7 and 9. This mixture of perfluorinated acid fluorides of varying chain length is reacted with a 50% molar excess of tertiary butyl aminoethyl methacrylate in a hexane solvent at reflux temperature. The product is recovered as in Example 1, and there is obtained a mixture of perfluoroalkyl amidoalkyl acrylates of the above formula having equal parts by weight of compounds in which the perfluoroalkyl group contains 6, 8, 10 and 12 carbon atoms.

*Example 8.—Preparation of N-tertiary-butyl-N-(perfluorooctanoyl) aminoethyl methacrylate*

Following the procedures of Example 1, the acid fluoride $CF_3(CF_2)_6COF$ is reacted with a 50% molar excess of tertiary butyl aminoethyl methacrylate, and there is obtained a good yield of the amido acrylate,

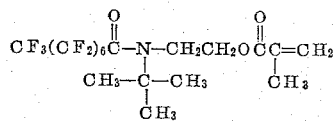

The following Examples A annd B show the preparation, for comparative purposes, of amidoalkyl acrylate monomers similar to the monomers of Examples 1 to 8, except that the bulky alkyl group adjacent to the amido nitrogen is not present.

*Example A.—Preparation of N-(perfluoro-9-methyldecanoyl) aminoethyl methacrylate*

(a) Preparation of

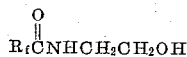

Into an ice-cooled stirred mixture of 37.0 g. (0.6 mole) of ethanolamine $H_2NCH_2CH_2OH$ in 200 ml. of

is slowly added 123.5 g. (0.218 mole) of

under a nitrogen atmosphere. After addition is complete, the mixture is allowed to warm up to room temperature and then refluxed for 4 hours. The reaction mixture is filtered from sticky insoluble material. The filtrate is washed twice with 100 ml. of $H_2O$ followed by two washings with 100 ml. portions of 1 N HCl, then with two washings with 100 ml. of 5% $NaHCO_3$ solution and finally with a 100 ml. portion of $H_2O$, dried with anhydrous magnesium sulfate and evaporated on a steam bath to yield 124.0 g. (94% yield) of a white solid product, melting at 88–89° C. and having the structure

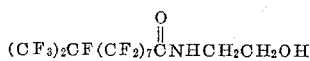

The infrared spectrum of this compound shows an amide I band at $5.85\mu$ and an amide II band at $6.48\mu$.

*Analysis.*—Calculated for $C_{13}H_6F_{21}NO_2$: C, 25.7; H, 1.00; N, 2.31. Found: C, 25.5; H, 1.00; N, 2.52.

(b) Preparation of

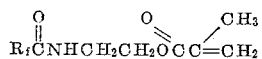

Into an ice-cooled stirred mixture of 607.2 g. (1.0 mole) of the amido alcohol

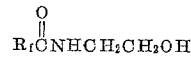

prepared as described above, and 202.4 g. (2.0 moles) of triethylamine in 2800 ml. of $CF_2ClCCl_2F$ there is slowly added 209.1 g. (2.0 moles) of methacrylyl chloride and 0.12 g. of p-methoxyphenol. The addition is completed during approximately one hour. Immediately, a fine white precipitate is formed giving the reaction mixture the appearance of a white latex. The entire mixture is refluxed for 3–4 hours. It is then filtered off and the filtrate is poured over crushed ice. The organic layer is separated and diluted with 3 liters of $CF_2ClCFCl_2$, then washed with 1 liter of $H_2O$, 1 liter of 1 N HCl solution, with three 300 ml. portions of a 25% $Na_2CO_3$ solution containing 1% NaOH and finally with two 1 liter portions of $H_2O$, dried with anhydrous $MgSO_4$ and heated on a steam bath to leave a liquid residue which solidifies on standing at room temperature. Recrystallization from a mixture of 200 ml. $CH_3OH$ and 1 liter petroleum ether yielded 350 g. (52%) of a white solid having the structure

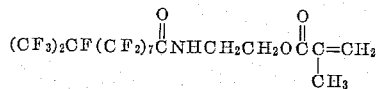

and M.P. 64–66.5° C. Infrared spectrum shows an amide band at $5.9\mu$, an ester band at $5.8\mu$ and a $6.1\mu$ peak characteristic of a double bond.

*Analysis.*—Calculated for $C_{17}H_{10}F_{21}NO_3$: C, 30.2; H, 1.49; N, 2.08. Found: C, 30.4; H, 1.84; N, 2.16.

*Example B.—Preparation of N-methyl-N-(perfluoro-9-methyldecanoyl) aminoethyl methacrylate*

To a stirred suspension of 6.5 g. (0.036 mole) of

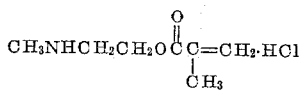

and 0.01 g. of p-methoxyphenol in 250 ml. of anhydrous benzene there is added slowly under an atmosphere of nitrogen 33.9 g. (0.06 mole) of

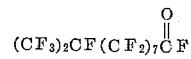

After addition is complete, the mixture is refluxed for 6 hours until no more HCl gas is evolved. The reaction mixture is poured over crushed ice to hydrolyze any unreacted acid fluoride and the organic layer is separated and washed with a 100 ml. portion of $H_2O$, two 100 ml. portions of a 25% solution of $Na_2CO_3$ containing 1% NaOH and finally with a 100 ml. portion of $H_2O$ dried with $MgSO_4$ and flash evaporated under reduced pressure. Drying in vacuo yielded 18.5 g. (69%) of liquid product, having the structure $$(CF_3)_2CF(CF_2)_7\underset{}{\overset{O}{\underset{\|}{C}}}\underset{\underset{CH_3}{|}}{N}-CH_2CH_2O\underset{}{\overset{O}{\underset{\|}{C}}}\underset{\underset{CH_3}{|}}{C}=CH_2$$

The infrared spectrum of this product shows an ester band at $5.8\mu$, an amide band at $5.9\mu$, and a $6.1\mu$ peak characteristics of a double bond.

POLYMERIZATION

The amidoalkyl acrylate monomers of the invention may be homopolymerized or copolymerized with other ethylenically unsaturated comonomers by polymerization methods well known in themselves, such as emulsion polymerization, suspension polymerization, solution polymerization or bulk polymerization.

The preferred polymerization technique is emulsion polymerization in an aqueous medium. According to this technique, the monomer is charged to a polymerization vessel (preferably equipped with a stirrer or other type of agitator, heating and/or cooling means) together with water, which is preferably deoxygenated and deionized, a polymerization catalyst, and a surfactant to stabilize the emulsion such that the polymer is obtained in the form of an aqueous latex. If desired, other additives may be used in the polymerization recipe, such for example, as water soluble organic solvents, such as acetone, ethyl alcohol, methyl alcohol, ethylene glycol, and the like, chain transfer agents such as mercaptans, carbon tetrachloride, carbon tetrabromide, and the like, crosslinking monomers such as alkylene glycol dimethacrylates, allyl methacrylate, divinylbenzene and the like, and inorganic salts such as chlorides, acetates, carbonates, phosphates, and borates to serve as buffers and electrolytes.

Suitable polymerization catalysts include generally those commonly used for the polymerization of acrylic monomers such, for example, as potassium persulfate, ammonium persulfate, hydrogen peroxide, barium peroxide, sodium peroxide, or organic catalysts such as 2,2′-azodiisobutyramidine dihydrochloride, 2,2′-azodiisobutyronitrile, ditertiary butyl peroxide, tertiary butyl hydroperoxide, benzoyl peroxide, tertiary butyl peracetate, tertiary butyl perbenzoate, acetyl peroxide, 2,4-dichlorobenzoyl peroxide, disuccinic acid peroxide, cumene hydroperoxide, dicumyl peroxide, lauroyl peroxide, methyl ethyl ketone peroxide, di(hydroxyheptyl) peroxide, and myristoyl peroxide. Such polymerization catalysts will generally be used in concentrations ranging between 0.01 and 3% and preferably between 0.1 and 2% by weight based on the weight of the monomer.

Suitable surfactants or emulsifying agents include generally those of the cationic, anionic, nonionic, or amphotoric types. The nonionic types are generally preferred when the final product may be diluted with other ionic materials. However, the cationic types can be used in most textile treating baths and, in some cases, may be preferred due to their substantive effect on cellulose. The hydrophobic portion of the surfactant may be hydrocarbon or may be fluorinated. Suitable surfactants that may be used include, for example, nonionic surfactants in which the hydrophillic group is a poly(ethoxy) group and the hydrophobic portion is either a hydrocarbon or a fluorocarbon group such as the ethylene oxide condensates of alkyl phenols, alkanols, alkyl amines, alkyl thiols, alkyl carboxylic acids, fluoroalkyl carboxylic acids, fluoroalkyl amides, and the like. Suitable nonionic surfactants include, e.g., those of the types $$R-\langle\bigcirc\rangle-O(CH_2CH_2O)_nH,\quad RNH(CH_2CH_2O)_nH$$

$$RO(CH_2CH_2O)_nH,\quad R\overset{O}{\underset{\|}{C}}NH(CH_2CH_2O)_nH$$

$$R\overset{O}{\underset{\|}{C}}O(CH_2CH_2O)_nH,\quad RS(CH_2CH_2O)_nH$$

where R is an alkyl radical having 8 to 22 carbon atoms and $n$ is an integer from 1 to 50; and those of the type $$R_f\overset{O}{\underset{\|}{C}}NH(CH_2CH_2O)_nH$$

where $R_f$ is a perfluoroalkyl or perfluorochloroalkyl radical having from 4 to 18 carbon atoms and where $n$ is an integer from 1 to 50. Specific examples of suitable nonionic surfactants include, e.g., $$C_8H_{17}-\langle\bigcirc\rangle-O(CH_2CH_2O)_nH,$$

$$C_{12}H_{25}-\langle\bigcirc\rangle-O(CH_2CH_2O)_nH,\quad C_{18}H_{37}NH(CH_2CH_2O)_nH$$

$$(CF_3)_2CF(CF_2)_7\overset{O}{\underset{\|}{C}}\underset{\underset{H}{|}}{N}(CH_2CH_2O)_nH$$

and $$CF_3(CF_2Cl)CF(CF_2)_7\overset{O}{\underset{\|}{C}}\underset{\underset{H}{|}}{N}(CH_2CH_2O)_nH$$

where $n$ is an integer having an average value of about 4 to 12.

Suitable anionic surfactants include, e.g., those in which the hydrophillic group is $$-\overset{O}{\underset{\|}{C}}-OM;\ -OSO_3M;\ -OPO_4M;\ -(CH_2CH_2O)_nSO_4M$$

where M is $NH_4^+$, $K^+$, $Na^+$, or the like; and where the hydrophobic portion is a long chain alkyl group, higher alkyl substituted benzene or naphthalene group or a fluoroalkyl group having from 4 to 18 carbon atoms, such for example, as $$C_{12}H_{25}OSO_3Na,\quad C_{10}H_{21}-\langle\bigcirc\rangle-O(CH_2CH_2O)_{10}SO_3NH_4$$

$$(CF_3)_2CF(CF_2)_5\overset{O}{\underset{\|}{C}}\underset{\underset{CH_3}{|}}{N}CH_2COOK$$

$$CF_3(CF_2Cl)(CF_2)_7\overset{O}{\underset{\|}{C}}\underset{\underset{CH_3}{|}}{N}-CH_2COOK\text{ and }(CF_3)_2CF(CF_2)_7COONH_4$$

Suitable cationic surfactants include, e.g., quaternary ammonium salts or amine salts containing at least one long chain alkyl, fluoroalkyl or higher alkyl substituted benzene or naphthalene group to provide the hydrophobic portion, such for example as $$[C_{18}H_{37}\underset{\underset{H}{|}}{N}(CH_3)_2]^+[CH_3COO]^-,\quad [C_{16}H_{33}N(CH_3)_3]^+Br^-$$

$$[C_{18}H_{37}N(CH_3)_3]^+Cl^-,\quad [C_{22}H_{45}N(CH_3)_3]^+Cl^-$$

$$\left[C_{18}H_{37}\underset{\underset{CH_3}{|}}{\overset{\overset{CH_3}{|}}{N}}-\langle\bigcirc\rangle\right]^+Cl^-,\quad [C_{18-22}H_{37-45}NH(CH_2CH_2O)_nH]^+[CH_3COO]^-$$

$$[C_{12-14}H_{25-29}\underset{\underset{H}{|}}{N}H(CH_2CH_2O)_nH]^+Cl^-$$

and $[CF_3(CF_2Cl)CF(CF_2)_5\overset{O}{\underset{\|}{C}}\underset{\underset{H}{|}}{N}HCH_2CH_2CH_2N(CH_3)_2]^+[CH_3COO]^-$ The polymerization is preferably carried out for a reaction period adjusted to obtain essentially quantitative conversion of the fluorinated amidoalkyl acrylate monomer. The optimum reaction time will depend upon the catalyst used and the polymerization temperature and other conditions, but will generally be in the range of from 0.5 to 24 hours. The polymerization temperature will depend upon the catalyst chosen. In the case of emulsion polymerization in aqueous media it will generally be in the range of from 20° to 90° C. The polymerization is most conveniently and generally preferably carried out at atmospheric pressure.

Comonomers suitable for copolymerizing with the fluorinated amidoalkyl acrylates of the invention include generally ethylenically unsaturated compounds particularly those containing a terminal ethylenic linkage. Suitable comonomers may include, for example, those containing relatively long-chain perfluoroalkyl groups. For instance, a mixture of two or more of the fluorinated amidoalkyl acrylates of the invention which may differ from one another, e.g. in the length of the perfluoroalkyl chain, may be copolymerized. Similarly, the fluorinated amidoalkyl acrylates of the invention may be copolymerized with other monomers containing perfluoroalkyl chains such, for example, as

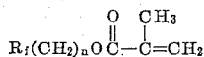

where $n$ is an integer from 1 to 6 and

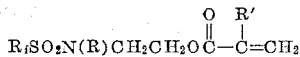

where $R_f$ is a perfluoroalkyl radical containing from 4 to 18 carbon atoms, and where $R'$ is H or $CH_3$.

Examples of other ethylenically unsaturated monomers suitable for copolymerization with the fluorinated amidoalkyl acrylates of the invention include butadienes such as 1,3-butadiene, 2-chlorobutadiene, 2-methyl-1,3-butadiene, 2,3-dichloro-1,3-butadiene; acrylic and methacrylic acids and their esters and amides such as methyl acrylate, methyl methacrylate, ethyl acrylate, ethyl methacrylate, butyl acrylate, butyl methacrylate, hexyl methacrylate, ethylhexyl acrylate, ethylhexyl methacrylate, octyl acrylate, octyl methacrylate, decyl acrylate, decyl methacrylate, lauryl acrylate, lauryl methacrylate, stearyl acrylate, stearyl methacrylate, hydroxyethyl and hydroxypropyl methacrylate, t-butylaminoethyl methacrylate, dimethylaminoethyl methacrylate, glycidyl acrylate, glycidyl methacrylate, acrylamide, methacrylamide, N-methylol acrylamide, N-methylol methacrylamide, N-isopropyl acrylamide, N-isopropyl methacrylamide, and the like; vinyl halides such as vinyl chloride, vinyl fluoride, vinylidene chloride, vinylidene fluoride, tetrafluoroethylene, and the like; vinyl esters, such as vinyl acetate, vinyl butyrate, vinyl laurate, vinyl stearate, and the like; vinyl alkyl ketones such as vinyl methyl ketone, vinyl ethyl ketone, and the like; vinyl ethers such as methyl vinyl ether, cetyl vinyl ether; styrene, alkyl styrene, vinyl silicone, maleic anhydride, maleic acid and the esters and amides thereof; fumaric acid and the esters and amides thereof; itaconic acid and the esters and amides thereof; crotonic acid and the esters and amides thereof; allylamine, allyl alcohol, allyl esters and ethers, acrylonitrile and methacryonitrile.

The following examples illustrate the homopolymerization and copolymerization of the amidoacrylate monomers of the invention:

*Example 9.—Homopolymerization of*

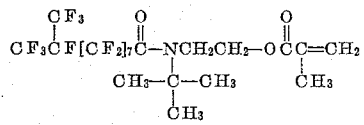

A solution of 5 grams of the above monomer in 4.0 milliliters of acetone is placed in a 7 oz. glass bottle. To this solution is added about 0.2 g. of the compound

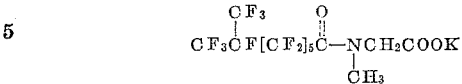

prepared as described in copending application Ser. No. 276,160, dissolved in 11.0 milliliters of deoxygenated, deionized water together with 0.15 g. of potassium persulfate as polymerization catalyst. The bottle is filled with nitrogen, capped, placed in a bath held at a constant temperature of 50° C., and maintained at this temperature with agitation for a period of 41 hours. There is obtained from this reaction a latex having a solids concentration of about 25% by weight and containing about 5 grams of polymer having the repeating units.

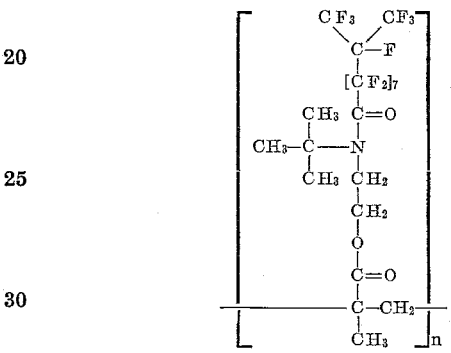

The homopolymer latex produced is ideally suited for the treatment of textiles and other fibrous materials in order to render them resistant to wetting by both aqueous and oleaginous systems. The textiles or other materials impregnated with such a latex are remarkably water and oil repellant due to the long chain perfluoroalkyl groups contained in the polymer chain.

*Example 10.—Copolymerization of*

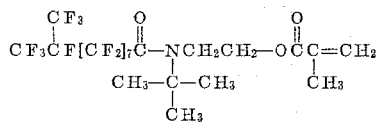

*with butyl methacrylate*

The same procedures as described in Example 9 for the homopolymerization are followed except that to the polymerization recipe employed for homopolymerization there is added 5.0 g. of butyl methacrylate as a comonomer and an additional 6 milliliters of deoxygenated, deionized water. There is obtained approximately 10 g. of a copolymer in the form of an aqueous latex having similar utility as the homopolymer.

*Example 11.—Polymerization of*

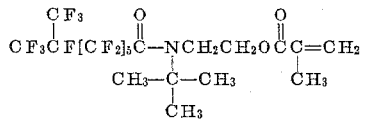

Following the procedures of Example 9, and employing as the surfactant the compound

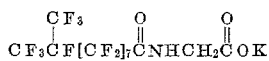

prepared as described in copending application Ser. No. 276,160, the above monomer is homopolymerized to form a latex containing approximately 25% solids. Following procedures similar to those used in Example 9, and using the above surfactant, the above monomer is copolymerized with an equal weight of neoprene.

*Example 12.—Polymerization of*

$$CF_3CF\text{-}[CF_2]_9\overset{CF_3}{\underset{CH_3\underset{CH_3}{\overset{|}{C}}-CH_3}{C}}-N-CH_2CH_2O\overset{O}{\underset{CH_3}{\overset{\|}{C}}}C=CH_2$$

Following the procedures of Example 9, the above monomer is homopolymerized in the presence of the compound $$CF_3CF[CF_2]_5\overset{CF_3}{\underset{CH_3}{\overset{|}{C}}}\overset{O}{\underset{}{\overset{\|}{C}}}NCH_2COONH_4$$

prepared as described in copending application Ser. No. 276,160, to provide a homopolymer in latex form. Using the same surfactant, the same monomer is copolymerized with about an equal weight of butadiene to provide the copolymer in the form of an aqueous latex.

*Example 13.—Homopolymerization of*

$$(CF_3)_2CF(CF_2)_7\overset{O}{\overset{\|}{C}}-N-CH_2CH_2O-\overset{O}{\overset{\|}{C}}C=CH_2$$
with substituents $CH_3-\underset{CH_3}{\overset{|}{C}}-CH_3$ and $CH_3$ A flask, 500 ml. in volume, is connected to a mechanical stirrer, a condenser and an addition funnel and is charged with 144 g. of deoxygenated distilled water containing in solution 3.5 g. of a nonionic fluorinated surfactant of the formula $$(CF_3)_2CF(CF_2)_5\overset{O}{\overset{\|}{C}}NH(CH_2CH_2O)_{11\,av.}{}^1H$$

There is then added a solution of 70.0 g. of the fluorinated monomer $$(CF_3)_2CF(CF_2)_7\overset{O}{\overset{\|}{C}}-N-CH_2CH_2O\overset{O}{\overset{\|}{C}}C=CH_2$$
with $CH_3-\underset{CH_3}{\overset{|}{C}}-CH_3$ and $CH_3$ prepared in accordance with Example 4, in 38.0 g. of acetone. This mixture is purged by bubbling nitrogen through it and stirred to induce emulsification. There is then added a solution of 0.35 g. of ammonium persulfate in two grams of water followed by 0.14 g. of sodium thiosulfate in 2 g. of water. Under a nitrogen atmosphere, this mixture is heated while stirring at a temperature of 60° C. for five hours. A latex is obtained containing 22% by weight of solids.

*Example 14.—Homopolymerization of*

$$(CF_3)_2CF(CF_2)_7\overset{O}{\overset{\|}{C}}-N-CH_2CH_2O-\overset{O}{\overset{\|}{C}}-C=CH_2$$
with $CH_3-\underset{CH_3}{\overset{|}{C}}-CH_3$ and $CH_3$ The homopolymerization of the above monomer prepared in accordance with Example 4 is carried out following the procedures described in Example 13, but using the following polymerization recipe:

(a) 21.0 g. of deoxygenated distilled water
(b) a solution of a fluorinated cationic surfactant of the formula $$CF_2Cl\overset{CF_3}{\underset{}{\overset{|}{C}}}F(CF_2)_5\overset{O}{\overset{\|}{C}}NHCH_2CH_2CH_2N(CH_3)_2\cdot CH_3COOH$$

¹ Av.=average, i.e., there is an average of eleven (CH₂CH₂O) units per molecule.

prepared by mixing 0.5 g. of the amine with 0.15 g. of glacial acetic acid.
(c) 10.0 g. of the above fluorinated amidoalkyl methacrylate monomer
(d) 5.4 g. of acetone
(e) 0.2 g. of 2,2′-azodiisobutyramidine dihydrochloride Polymerization of the above recipe is conducted at a temperature of 65° C. for five hours. A stable latex containing about 26% by weight of solids is obtained.

*Example 15.—Homopolymerization of*

$$(CF_3)_2CF(CF_2)_7\overset{O}{\overset{\|}{C}}-N-CH_2CH_2O-\overset{O}{\overset{\|}{C}}-C=CH_2$$
with $CH_3-\underset{CH_3}{\overset{|}{C}}-CH_3$ and $CH_3$ The homopolymerization of the above monomer prepared in accordance with Example 4 is carried out following the same procedure as in Example 13, but using the following polymerization recipe:

(a) 21.0 g. of deoxygenated distilled water
(b) 0.5 g. of a nonionic surfactant of the formula $$C_{12}H_{25}\text{-}\!\!\left\langle\!\!\!\bigcirc\!\!\!\right\rangle\!\!\text{-}O(CH_2CH_2O)_{9.5av.}H$$

(c) 10.0 g. of the above fluorinated amidoalkyl methacrylate monomer
(d) 0.2 g. of N-methylolacrylamide
(e) 5.4 g. of acetone
(f) 0.1 g. of ammonium persulfate
(g) 0.04 g. of sodium thiosulfate The polymerization is conducted at a temperature of 65° C. for 4–5 hours and there is obtained a stable latex containing 26% solids.

*Example 16.—Homopolymerization of*

$$(CF_3)_2CF(CF_2)_7\overset{O}{\overset{\|}{C}}-N-CH_2CH_2O-\overset{O}{\overset{\|}{C}}-C=CH_2$$
with $CH_3-\underset{CH_3}{\overset{|}{C}}-CH_3$ and $CH_3$ Example 14 is repeated using the same polymerization recipe and polymerization conditions except that in the place of the surfactant used in Example 14 there is employed 0.8 g. of a cationic surfactant of the formula $$C_{17}H_{35}CH_2N(CH_3)_2\cdot CH_3COOH$$

prepared by mixing 0.5 g. of the amine with 0.3 g. of glacial acetic acid. A stable latex containing 26% total solids is obtained.

*Example 17.—Homopolymerization of*

$$(CF_3)_2CF(CF_2)_3\overset{O}{\overset{\|}{C}}-N-CH_2CH_2O\overset{O}{\overset{\|}{C}}-C=CH_2$$
with $CH_3-\underset{CH_3}{\overset{|}{C}}-CH_3$ and $CH_3$ Following the procedures of Example 13, the above monomer is homopolymerized using the following polymerization recipe:

(a) 10.5 g. of deoxygenated distilled water
(b) The cationic surfactant $C_{18}H_{37}N(CH_3)_2\cdot CH_3COOH$ prepared by mixing 0.25 g. of the amine with 0.15 g. of glacial acetic acid
(c) 5.0 g. of the above fluorinated amidoalkyl acrylate
(d) 2.7 g. of acetone
(e) 0.1 g. of 2,2′-azodiisobutyramidine hydrochloride Using the above recipe, polymerization is carried out for a period of 4 hours at 70° C. producing a stable latex containing 26% by weight of solids.

Example 18.—Homopolymerization of

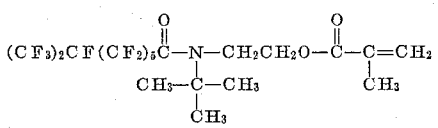

The same recipe and procedures employed in Example 16 are used, except that the above fluorinated amidoalkyl methacrylate monomer is used and that the polymerization is carried out for five hours at 65° C. A stable latex containing 26% by weight of solids is obtained.

Example 19.—Homopolymerization of

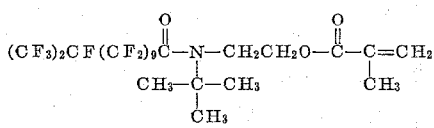

The above fluorinated amidoacrylate monomer is homopolymerized using the same procedures and polymerization recipe used in Example 17 except that the polymerization is carried out for 4 hours at a temperature of 70° C. A stable latex is obtained containing about 25% by weight of solids.

Example 20.—Copolymerization of a mixture of monomers of the formula

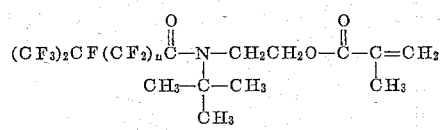

A mixture of fluorinated amidoacrylates of the above formula in which the perfluoroalkyl portion is of varying chain length is copolymerized using the following polymerization recipe:

(a) 21.0 g. of deoxygenated distilled water
(b) A surfactant of the formula $$C_{17}H_{35}CH_2N(CH_3)_2 \cdot CH_3COOH$$

made by mixing 0.5 g. of the amine with 0.3 g. of glacial acetic acid
(c) 2.5 g. of the above fluorinated amidoalkyl acrylate monomer in which the value of $n$ equals 3
(d) 2.5 g. of the above fluorinated amidoalkyl acrylate monomer in which the value of $n$ equals 5
(e) 2.5 g. of the above fluorinated amidoalkyl acrylate monomer in which the value of $n$ equals 7
(f) 2.5 g. of the above fluorinated amidoalkyl acrylate monomer in which the value of $n$ equals 9
(g) 5.4 g. of acetone
(h) 0.2 g. of 2,2'-azodiisobutyramidine dihydrochloride The polymerization using the above recipe is carried out for a period of 4 hours at a temperature of 70° C. A stable latex of the copolymer containing 27% solids is obtained.

Example 21.—Copolymerization of

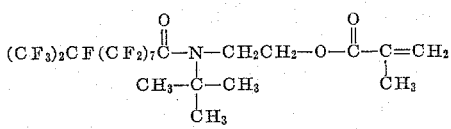

A random copolymer of the above fluorinated monomer and a mixture of octyl methacrylate and decyl methacrylate containing 60% by weight of octyl methacrylate and 40/ by weight of decyl methacrylate is polymerized in the following recipe:

(a) 27 g. of deoxygenated distilled water
(b) 7 g. of a mixture of octyl and decyl methacrylates (60:40 weight ratio)
(c) 3 g. of the above fluorinated amidoalkyl acrylate
(d) 5 g. of acetone
(e) 0.5 g. of dimethyloctadecylamine
(f) 0.3 g. of glacial acetic acid
(g) 0.2 g. of 2,2'-azodiisobutyramidine hydrochloride The above mixture is polymerized with agitation at a temperature of 70° C. for 21 hours. A latex is obtained containing 22% by weight of solids.

Example 22.—Copolymerization of

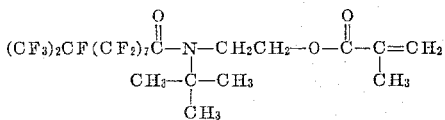

A block copolymer of the above fluorinated monomer and decyl methacrylate is prepared in the following manner. The initial charge to the polymerization flask is as follows:

(a) 27 g. of deoxygenated distilled water
(b) 2 g. of decyl methacrylate
(c) 5 g. of acetone
(d) 0.5 g. of dimethyloctadecylamine
(e) 0.3 g. of glacial acetic acid
(f) 0.1 g. of 2,2'-azodiisobutyramidine hydrochloride The above mixture is agitated at 70° C. for one hour following which there is added successively at one-hour intervals the following additional portions of monomers while continuing agitation at 70° C.

At end of:
First hour—1 g. of the above fluorinated amidoalkyl acrylate in 2 g. of acetone
Second hour—2 g. of decyl methacrylate
Third hour—1 g. of the above fluorinated amidoalkyl acrylate in 2 g. of acetone
Fourth hour—2 g. of decylmethacrylate
Fifth hour—1 g. of the above fluorinated acrylate in 1 g. of acetone and 0.1 g. of the above azo polymerization catalyst in 1 g. of water
Sixth hour—1 g. of decyl methacrylate Following these additions, the polymerization is continued for another 18 hours, producing a latex containing 23% by weight of solids.

The following Examples C and D show, for comparative purposes, the polymerization of the monomers of Examples A and B respectively, which are similar to the fluorinated amidoalkyl acrylate monomers of the invention except that they do not contain a bulky alkyl group attached to the amido nitrogen.

Example C.—Polymerization of

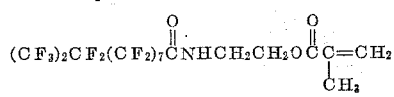

The above monomer prepared in accordance with Example A is homopolymerized following the procedures of Example 13 and employing the following polymerization recipe:

(a) 21.0 g. of deoxygenated distilled water
(b) 0.5 g. of fluorinated nonionic surfactant of the structure

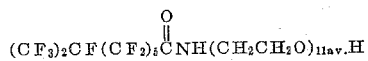

(c) 10.0 g. of the above fluorinated amidoalkyl acrylate monomer
(d) 5.4 g. of acetone
(e) 0.06 g. of ammonium persulfate
(f) 0.02 g. of sodium thiosulfate The above mixture is polymerized with agitation at a temperature of 25° C. for 17 hours. A stable latex containing 27% solids is obtained.

Example D.—*Polymerization of*

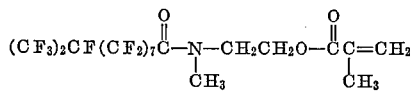

The above fluorinated amidoalkyl acrylate prepared in accordance with Example B is homopolymerized according to the procedures described in Example 13 using the following polymerization recipe:

(a) 12.0 g. of deoxygenated distilled water
(b) 0.3 g. of the fluorinated nonionic surfactant

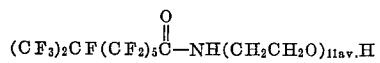

(c) 0.15 g. of the fluorinated nonionic surfactant

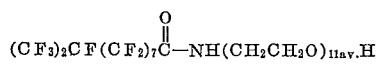

(d) 6 g. of the above fluorinated amidoalkyl acrylate monomer
(e) 5.2 g. of acetone
(f) 0.05 g. of ammonium persulfate
(g) 0.02 g. of sodium thiosulfate The above mixture is polymerized with agitation at a temperature of 60° C. for 2½ hours to give a stable latex containing 25% by weight of solids.

APPLICATION OF COATINGS

As previously pointed out, the polymers prepared from the fluorinated amidoalkyl acrylates of the invention are highly effective for imparting oil and water repellency properties to substrates to which they are applied.

Coatings of these polymers may be prepared by any of the well-known techniques. When prepared by bulk or suspension polymerization techniques, these polymers may be applied, for example, from a dilute solution in suitable solvents such as the fluoroalkanes, fluorochloroalkanes, fluoroalkyl substituted aromatics, alkyl esters of perfluoroalkanoic acids, chlorinated alkanes or aromatics, hydrocarbon aromatics, ketones, esters, and ethers. Concentrations of the fluorinated polymer in the solvent to provide coatings with effective oil and water repellency properties will generally be of the order of 0.01 to 10% and preferably from 0.1 to 1.0% by weight. If the polymer is obtained as an aqueous latex or emulsion, the polymer coating may be applied by diluting the latex concentrate obtained from a polymerization with water or other liquid diluting agent to obtain a diluted latex or dispersion usually of the order of from 0.01 to 10% by weight of the polymer and preferably from 0.1 to 1.0% by weight based on the total weight of the latex.

The polymer solution or latex may be applied by any of the known techniques such as by dipping, spraying, brushing, padding, roll coating or by any desired combination of such techniques. The optimum method of application will depend principally on the type of substrate being coated.

Coatings of the fluorinated polymers of the invention may be applied to any desired substrate, porous or non-porous. They are particularly suited for application to porous materials such as textiles, leather, paper, wood, masonry, unglazed porcelain and the like to provide valuable oil and water repellency properties. However, they may also be applied to non-porous materials such as metals, plastics, glass, painted surfaces and the like to provide similar oil and water repellency properties.

For application to textile materials such as fabrics (woven and non-woven), fibers, films, yarns, cut staple, thread, etc., or articles made from fabrics, fibers, films, yarns, etc., the polymers of the invention are preferably prepared as aqueous latices or emulsions which are then diluted, preferably with water, and applied to the textiles from pad baths, which may contain other treating materials. In accordance with this standard technique, the fabric or the textile material is passed through the bath, passed through squeeze rolls adjusted to leave the desired amount of the polymer latex on the fabric, dried at a temperature of about 25 to 110° C. and then cured in a curing oven at a temperature in the range of from 140 to 195° C. for from 0.5 to 20 minutes. The weight of fluorinated monomer deposited on the fabric may range, for example, from 0.01 to 10%. Preferably, very small amounts are used, generally in the range of from 0.1 to 0.5% to give high degrees of water and oil repellency. Any types of textile materials, such as cotton, wool, fiber glass, silk, regenerated cellulose, cellulose esters, cellulose ethers, polyesters, polyamides, polyolefins, polyacrylonitrile, polyacrylic esters, inorganic fibers, etc., either alone or blended in any combination, may be successfully coated with the fluorinated polymers of the invention.

It will be often advantageous to use the fluorinated acrylate homopolymers or copolymers of the invention in combination with other resins, polymers, crease-proofing agents, softeners, sizes, water repellents, etc. It is particularly advantageous to employ mixtures of emulsions of the fluorine-containing acrylate polymers or copolymers of the invention with separately prepared emulsions of other polymers or copolymers. The other polymer or copolymer is preferably of a non-fluorinated variety. Non-fluorinated polymers and copolymers suitable for admixture with the fluorinated polymers of the invention include, in particular, polymers and copolymers of the alkyl acrylates and alkyl methacrylates, such as methyl methacrylate, ethyl methacrylate, isopropyl methacrylate, butyl methacrylate, 2-ethylbutyl methacrylate, isobutyl methacrylate, isoamyl methacrylate, hexyl methacrylate, heptyl methacrylate, 2-ethylhexyl methacrylate, 3,5,5-trimethylhexyl methacrylate, n-octyl methacrylate, decyl methacrylate, lauryl methacrylate, stearyl methacrylate, cyclohexyl methacrylate, hydroxyethyl methacrylate, hydroxypropyl methacrylate, t-butyl amino ethyl methacrylate, dimethylaminoethyl methacrylate, glycidyl methacrylate, ethyl acrylate, isopropyl acrylate, butyl acrylate, 2-ethylhexyl acrylate, n-octyl acrylate, decyl acrylate, lauryl acrylate, and stearyl acrylate. Also useful are polymers and copolymers of acrylic acid, methacrylic acid, styrene, alkyl styrene, butadiene, 2-methyl-1,3-butadiene, 2-chloro-1,3-butadiene, 2,3-dichloro-1,3-butadiene; polymers and copolymers of vinyl esters such as vinyl acetate, vinyl butyrate, vinyl laurate, vinyl stearate, vinyl 2-ethylhexanoate; polymers and copolymers of vinyl halides and vinylidene halides, such as vinyl chloride, vinylidene chloride, vinyl fluoride, vinylidene fluoride, chlorotrifluoroethylene and tetrafluoroethylene; polymers and copolymers of allyl esters such as allyl propionate, or allyl caprylate; polymers and copolymers of vinyl ketones such as vinyl methyl ketone, vinyl ethyl ketone and the like; polymers and copolymers of vinyl ethers such as methyl vinyl ether, cetyl vinyl ether and the like; polymers and copolymers of acrylamide, methacrylamide, N-methylol acrylamide, N-methylol methacrylamide, N-isopropyl acrylamide; and acrylonitrile and methacrylonitrile.

To illustrate the performance of the polymer latices prepared in accordance with the previous examples in imparting superior water and oil repellency properties to fabrics, pad baths I through VIII are made up from the fluorinated acrylate polymer latices prepared in accordance with Examples 13 through 20 respectively. In each case, the latex concentrate as prepared is diluted with water to provide an emulsion with a pad bath concentration of 0.2% by weight of the bath of the fluorinated amidoalkyl acrylate polymer of the invention. In each case, the latex of the fluorinated polymer was mixed with a latex of a decyl methacrylate-N-methylol acrylamide copolymer to provide a final pad bath containing 0.2% by weight of the fluorinated amidoalkyl acrylate polymer of the invention and 0.8% by weight of the decyl methacrylate-N-methylol acrylamide copolymer. The decyl methacrylate latex employed in these pad baths is prepared by procedure similar to that used in Example 16 substituting 95% decyl methacrylate and 5% N-methylol acrylamide for the fluorinated amidoalkyl acrylate monomer to obtain a latex containing about 25% by weight of copolymer.

For comparative purposes, pad baths IX and X are prepared using the fluorinated amidoalkyl acrylate polymer latices of Examples C and D which are similar to the latices prepared in accordance with the invention except that the fluorinated amidoalkyl acrylate monomer lacks the bulky alkyl group attached to the amido nitrogen. Pad baths IX and X are similarly adjusted by dilution of the latex concentrates to a pad bath strength of 0.2% of the fluorinated amidoalkyl acrylate polymer and 0.8% of the decyl methacrylate-N-methylol acrylamide copolymer. Using pad baths I to X, separate pieces of 80 x 80 plain weave white cotton print cloth are padded through the baths and passed through squeeze rolls adjusted to leave 100% by weight of the pad bath on the fabric (thus leaving 1% by weight of total polymer solids). The fabric pieces are then dried at 105–110° C. for 2 to 3 minutes and then cured in a curing oven at 170° C. for three minutes.

The water repellency of the fabric pieces is tested using the A.A.T.C.C. standard test method 22–1964 of the American Association of Textile Chemists and Colourists. According to this test, the fabric sample, fastened securely in a 6" metal hoop, is held at a 45° angle and sprayed with a measured amount of water at 80±2° F. and, after the holder is tapped to remove excess water, the wetting effect on the upper and lower surfaces of the fabric is observed. The following rating system is employed:

TABLE I

| Observed wetting: | Rating |
|---|---|
| Complete wetting of upper and lower surface | 0 |
| Complete wetting of upper surface | 50 |
| Partial wetting of upper surface | 70 |
| Wetting of upper surface at spray points | 80 |
| Slight random sticking or wetting on upper surface | 90 |
| No wetting or sticking of water droplets on upper surface | 100 |

The oil repellency properties of the fabric are tested by carefully placing drops of a mixture of Nujol (purified petroleum oil) and n-heptane, containing a dissolved dye to aid in observation, on the test fabric under tension. A rating value is assigned from 0 to 150 depending on whether the droplet penetrates or fails to penetrate the fabric in 3 minutes. The rating system employed is as follows:

TABLE II

| Observed wetting: | Rating |
|---|---|
| Wetting by 100% Nujol | 0 |
| No wetting by 100% Nujol | 50 |
| No wetting by 90% Nujol–10% n-heptane | 60 |
| No wetting by 80% Nujol–20% n-heptane | 70 |
| No wetting by 70% Nujol–30% n-heptane | 80 |
| No wetting by 60% Nujol–40% n-heptane | 90 |
| No wetting by 50% Nujol–50% n-heptane | 100 |
| No wetting by 40% Nujol–60% n-heptane | 110 |
| No wetting by 30% Nujol–70% n-heptane | 120 |
| No wetting by 20% Nujol–80 n-heptane | 130 |
| No wetting by 10% Nujol–90% n-heptane | 140 |
| No wetting by 100% n-heptane | 150 |

The results of water repellency and oil repellency tests conducted as described above on samples of fabric treated with pad baths I through X are shown in Table III below:

TABLE III

| Pad Bath No. | Pad Bath | | Decyl methacrylate-N-methylol acrylamide copolymer (percent by wt. of copolymer in pad bath) | Oil repellency rating | Water repellency rating (AATCC spray) |
|---|---|---|---|---|---|
| | Fluorinated amidoalkyl acrylate polymer | | | | |
| | Prepared as in Example | Percent by wt. of polymer in pad bath | | | |
| I | 13 | 0.2 | 0.8 | 120 | 90 |
| II | 14 | 0.2 | 0.8 | 110 | 90 |
| III | 15 | 0.2 | 0.8 | 100 | 90 |
| IV | 16 | 0.2 | 0.8 | 110 | 90 |
| V | 17 | 0.2 | 0.8 | 100 | 90 |
| VI | 18 | 0.2 | 0.8 | 100 | 90 |
| VII | 19 | 0.2 | 0.8 | 110 | 100 |
| VIII | 20 | 0.2 | 0.8 | 110 | 100 |
| IX | C | 0.2 | 0.8 | 0 | 50 |
| X | D | 0.2 | 0.8 | 0 | 90 |

As can be seen from the results in Table III, the pad baths prepared using the fluorinated amidoalkyl acrylate polymers of Examples 13 to 21, in which the fluorinated amidoalkyl acrylate monomer carries a bulky alkyl group on the amido nitrogen, consistently give excellent oil and water repellency ratings. In contrast, pad baths IX and X using the fluorinated amidoalkyl acrylate polymers prepared in accordance with Examples C and D, wherein the fluorinated amidoalkyl acrylate monomer lacks the bulky alkyl group on the amido nitrogen, fail completely to impart oil repellency properties to the fabric, although some degree of water repellency is obtained.

It is to be understood that the foregoing examples are given for the purposes of illustration only and that the invention is not limited thereto, and that other variations and embodiments within the spirit of the invention are included within the scope of the appended claims.

We claim:
1. Compounds of the formula

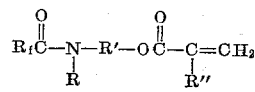

where $R_f$ is a perfluorinated alkyl radical having from 4 to 18 carbon atoms, where R is a branched alkyl radical having from 4 to 10 carbon atoms, where R' is an alkylene radical having from 2 to 6 carbon atoms, and where R" is hydrogen or a methyl group.

2. Compounds of the formula

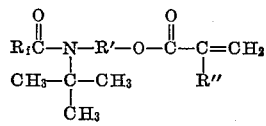

where $R_f$ is a perfluorinated alkyl radical having from 6 to 18 carbon atoms, where $R'$ is an alkylene radical having from 2 to 4 carbon atoms, and where $R''$ is hydrogen or a methyl radical.

3. Compounds according to claim 2 where $R'$ is ethylene.

4. Compounds according to claim 2 where $R''$ is methyl.

5. Compounds of the formula

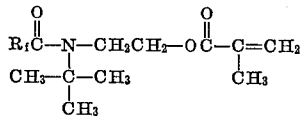

where $R_f$ is a perfluorinated alkyl radical having from 6 to 18 carbon atoms.

6. Polymers of the compounds of claim 1 wherein the polymer comprises a plurality of repeating units of the formula

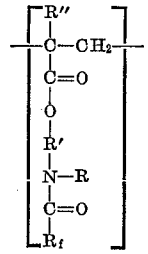

7. Polymers of claim 6 wherein R is a tertiary butyl radical.

8. Polymers of claim 7 wherein $R'$ is an alkylene radical containing 2 carbon atoms and wherein $R''$ is a methyl radical.

9. A latex of a polymer of claim 8.

References Cited by the Examiner

UNITED STATES PATENTS 3,238,236   3/66   Hauptschein et al. _____ 260—29.6

MURRAY TILLMAN, *Primary Examiner.*

J. L. WHITE, *Assistant Examiner.*